(12) United States Patent
Perryman et al.

(10) Patent No.: US 8,923,359 B1
(45) Date of Patent: Dec. 30, 2014

(54) LONG CAVITY LASER SENSOR FOR LARGE FOV AUTO-TRACKING

(75) Inventors: Gary Paul Perryman, Arlington, TX (US); Mark K. Browder, Frisco, TX (US); James Richard Wood, Grapevine, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 547 days.

(21) Appl. No.: 13/194,639

(22) Filed: Jul. 29, 2011

Related U.S. Application Data

(60) Provisional application No. 61/371,404, filed on Aug. 6, 2010.

(51) Int. Cl.
| | | |
|---|---|---|
| *G01S 7/48* | (2006.01) | |
| *H01S 3/13* | (2006.01) | |
| *G01S 17/58* | (2006.01) | |
| *H01S 3/139* | (2006.01) | |
| *G01S 17/42* | (2006.01) | |
| *G01S 7/481* | (2006.01) | |
| *G01S 7/491* | (2006.01) | |
| *G01S 7/51* | (2006.01) | |

(52) U.S. Cl.
CPC .............. *H01S 3/139* (2013.01); *G01S 17/58* (2013.01); *G01S 17/42* (2013.01); *G01S 7/4808* (2013.01); *G01S 7/51* (2013.01); *G01S 7/4812* (2013.01); *G01S 7/4918* (2013.01); *H01S 3/1306* (2013.01)
USPC ................... 372/99; 372/29.014; 372/29.021; 356/4.01; 356/8; 356/152.2

(58) Field of Classification Search
USPC .................................. 372/99, 29.014, 29.021
See application file for complete search history.

(56) References Cited

U.S. PATENT DOCUMENTS

| | | | | | |
|---|---|---|---|---|---|
| 3,002,417 | A | * | 10/1961 | Harth | 250/203.1 |
| 3,731,103 | A | * | 5/1973 | O'Meara | 250/203.2 |
| 3,855,544 | A | * | 12/1974 | Bowness | 372/97 |
| 3,869,210 | A | * | 3/1975 | Fletcher et al. | 356/459 |
| 3,904,274 | A | * | 9/1975 | Feinleib et al. | 359/295 |
| 3,967,899 | A | * | 7/1976 | O'Meara | 250/201.9 |
| 3,968,456 | A | | 7/1976 | Welch | |
| 4,016,415 | A | * | 4/1977 | O'Meara | 250/201.9 |
| 4,102,572 | A | * | 7/1978 | O'Meara | 250/201.9 |
| 4,117,319 | A | * | 9/1978 | White, III | 250/201.1 |
| 4,146,307 | A | * | 3/1979 | Gaffard | 359/224.1 |
| 4,249,140 | A | * | 2/1981 | Frieberg | 372/38.01 |
| 4,278,948 | A | * | 7/1981 | Evtuhov | 372/92 |
| 4,477,720 | A | * | 10/1984 | Pearson | 250/201.9 |

(Continued)

OTHER PUBLICATIONS

Driels, Morris R., and Uday S. Pathre. "Robot calibration using an automatic theodolite." The International Journal of Advanced Manufacturing Technology9.2 (1994): 114-125. http://link.springer.com/article/10.1007%2FBF01750418#.*

(Continued)

*Primary Examiner* — Ari M Diacou
(74) *Attorney, Agent, or Firm* — Withrow & Terranova, PLLC

(57) ABSTRACT

The presently disclosed technique presents laser-based method and apparatus for use in remote sensing. In general, objects within a field of view are lased by a long cavity laser apparatus. Returns are detected, captured, and processed to identify actual objects of interest. These can then be communicated to a user. Over time, the actual objects of interest can be auto-tracked.

17 Claims, 2 Drawing Sheets

(56) References Cited

U.S. PATENT DOCUMENTS

| | | | |
|---|---|---|---|
| 4,742,522 A * | 5/1988 | Linford | 372/2 |
| 4,776,691 A * | 10/1988 | Johnson et al. | 356/152.1 |
| 4,790,654 A * | 12/1988 | Clarke | 356/310 |
| 4,902,127 A * | 2/1990 | Byer et al. | 356/28.5 |
| 5,237,331 A * | 8/1993 | Henderson et al. | 342/54 |
| 5,353,109 A | 10/1994 | Langdon et al. | |
| 5,485,012 A | 1/1996 | Liebson | |
| 5,526,172 A * | 6/1996 | Kanack | 359/291 |
| 5,638,164 A * | 6/1997 | Landau | 356/5.01 |
| 5,893,085 A | 4/1999 | Phillips et al. | |
| 5,996,702 A * | 12/1999 | Hall | 172/4.5 |
| 6,216,540 B1 | 4/2001 | Nelson et al. | |
| 6,233,085 B1 * | 5/2001 | Johnson | 359/279 |
| 6,653,971 B1 | 11/2003 | Guice et al. | |
| 6,672,167 B2 | 1/2004 | Buell et al. | |
| 6,734,952 B2 * | 5/2004 | Benz et al. | 356/5.01 |
| 6,809,307 B2 * | 10/2004 | Byren et al. | 250/201.9 |
| 6,885,497 B1 | 4/2005 | Monroe | |
| 6,922,430 B2 * | 7/2005 | Biswas et al. | 372/100 |
| 6,961,171 B2 * | 11/2005 | Byren et al. | 359/333 |
| 7,002,127 B2 * | 2/2006 | Billman | 250/201.9 |
| 7,017,467 B1 | 3/2006 | Monroe | |
| 7,286,209 B1 * | 10/2007 | Hopwood et al. | 356/4.01 |
| 7,626,152 B2 * | 12/2009 | King et al. | 250/201.9 |
| 7,970,040 B1 * | 6/2011 | Sprangle et al. | 372/98 |
| 8,188,905 B2 * | 5/2012 | Gallivan | 342/13 |
| 8,362,410 B2 * | 1/2013 | King et al. | 250/201.9 |
| 8,379,191 B2 * | 2/2013 | Braunecker et al. | 356/4.07 |
| 8,415,600 B2 * | 4/2013 | Hutchin | 250/201.9 |
| 2002/0110164 A1 * | 8/2002 | Vetrovec | 372/36 |
| 2002/0135509 A1 * | 9/2002 | Talbot et al. | 342/127 |
| 2003/0169414 A1 * | 9/2003 | Benz et al. | 356/5.1 |
| 2004/0069927 A1 * | 4/2004 | Billman | 250/206.1 |
| 2004/0095968 A1 * | 5/2004 | Avizonis et al. | 372/6 |
| 2004/0145801 A1 * | 7/2004 | Rice et al. | 359/349 |
| 2005/0160822 A1 | 7/2005 | Langdon | |
| 2006/0191148 A1 * | 8/2006 | Lippuner | 33/290 |
| 2006/0271298 A1 * | 11/2006 | MacIntosh et al. | 702/5 |
| 2008/0042042 A1 * | 2/2008 | King et al. | 250/201.9 |
| 2009/0028198 A1 * | 1/2009 | Belenkii | 372/33 |
| 2009/0097508 A1 * | 4/2009 | Protz et al. | 372/6 |
| 2010/0002743 A1 * | 1/2010 | Markov et al. | 372/96 |
| 2010/0290063 A1 | 11/2010 | Bakhtiari et al. | |
| 2011/0032507 A1 * | 2/2011 | Braunecker et al. | 356/5.01 |
| 2011/0103410 A1 * | 5/2011 | Hutchin | 372/9 |
| 2011/0176565 A1 * | 7/2011 | Hutchin | 372/27 |
| 2012/0018614 A1 * | 1/2012 | King et al. | 250/201.9 |
| 2012/0170599 A1 * | 7/2012 | Sprangle et al. | 372/5 |

OTHER PUBLICATIONS

Driels, Morris R., and Uday S. Pathre. "Vision-based automatic theodolite for robot calibration." Robotics and Automation, IEEE Transactions on 7.3 (1991): 351-360.*

Linford, Gary J. et al., "Very Long Lasers," Applied Optics, vol. 13, No. 2, Feb. 1974, pp. 379-390.

* cited by examiner

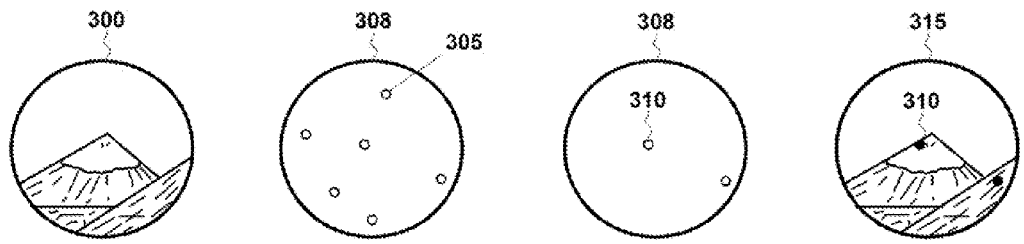
*FIG. 3A*  *FIG. 3B*  *FIG. 3C*  *FIG. 3D*
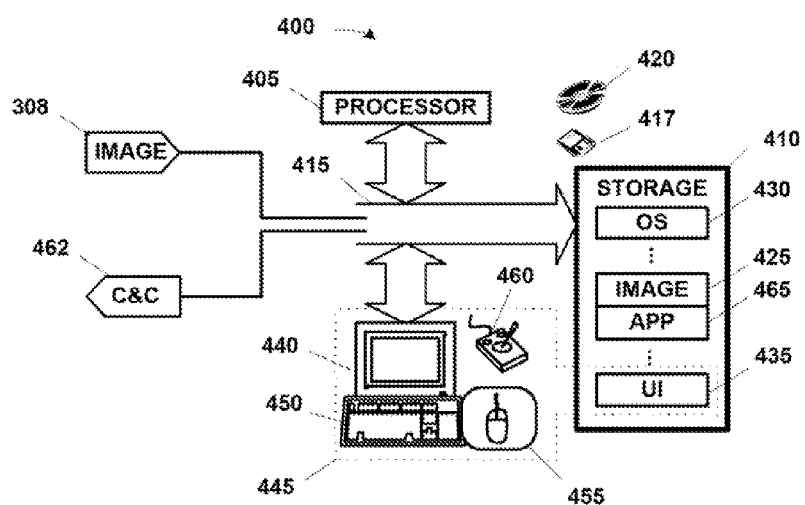
*FIG. 4*

LONG CAVITY LASER SENSOR FOR LARGE FOV AUTO-TRACKING

CROSS-REFERENCE TO RELATED APPLICATIONS

The priority to U.S. Provisional Application Ser. No. 61/371,404, filed on Aug. 6, 2010, entitled "Long Laser Sensor," in the name of the inventors Paul Perryman et al., is hereby claimed pursuant to 35 U.S.C. §119(e). This provisional application is also hereby incorporated by reference for all purposes as if set forth verbatim herein.

STATEMENT REGARDING FEDERALLY SPONSORED RESEARCH OR DEVELOPMENT

Not applicable.

BACKGROUND OF THE INVENTION

The present invention pertains to detection and auto-tracking of objects in a field of view using a laser-based method and apparatus, and, more particularly, doing so with a long cavity laser.

The following discussion introduces various aspects of the art that may be related to various aspects of what is described and/or claimed below. It provides background information to facilitate a better understanding of the various aspects of that disclosure. As the section's title implies, this is a discussion of "related" art. That such art is related in no way implies that it is also "prior" art. The related art may or may not be prior art. The discussion in this section of this document is to be read in this light, and not as admissions of prior art.

Laser-based systems used in object detection and auto-tracking suffer from a number of difficulties and drawbacks. Such systems typically provide a small, or narrow, field of view ("FOV") used to sense across large areas called a field of regard ("FOR"). This deficiency becomes more acute in an auto-tracking application where the detected objects may be moving across those same large areas. These systems therefore typically are designed to scan a narrow FOV quickly and repeatedly across the entire area. This frequently is done using electromechanical means such as servo-motors, which give off noise, consume power, and generate heat. Logistically, this complicates systems and drives them to larger sizes to accommodate these types of concerns. It also reduces their stealth, thereby making them more vulnerable to countermeasures reducing or eliminating their effectiveness, sometimes to the point of destruction.

The presently disclosed technique is directed to resolving, or at least reducing, one or all of the problems mentioned above.

SUMMARY

The presently disclosed technique presents laser-based method and apparatus for use in remote sensing.

The apparatus comprises: a long cavity laser that, in operation, lases within a field of view; a detector for detecting received radiation reflected from the lasing within the field of view by the long cavity laser and outputting data representative thereof; and a processing subsystem. The processing subsystem includes a storage for storing the data output by the detector; and a programmed computing device. In operation, the programmed computing device processes the stored data to: identify potential objects of interest in the field of view of the sensing apparatus; identify actual objects of interest from among the identified potential objects of interest; and communicate locations of the identified actual objects.

The method comprises: remotely acquiring data representative of the content of the field of view from a long laser sensor; and processing the acquired data to: identify potential objects of interest in the field of view of the sensing apparatus; identify actual objects of interest from among the identified potential objects of interest; and overlay locations of the identified actual objects on the display of the field of view.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which:

FIG. 3A-FIG. 3D illustrate the detection and identification of objects of interest in a field of view in one particular embodiment in accordance with the presently disclosed technique;

FIG. 4 depicts selected portions of the hardware and software architecture of a computing apparatus such as may be employed in the capture and processing of the detected returns;

Figure 1:
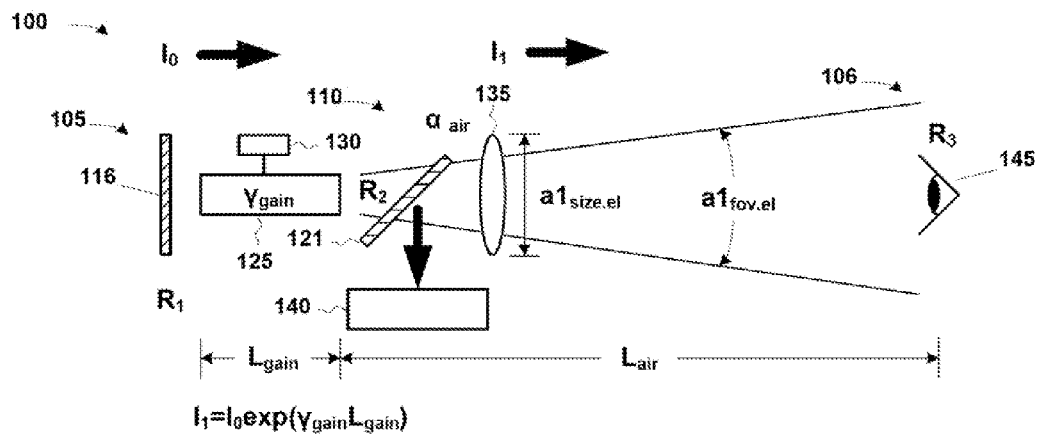
FIG. 1-FIG. 2 conceptually diagram the adaptation of long cavity lasing in the presently disclosed technique.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The presently disclosed laser-based technique provides auto-tracking within a large field of view ("FOV") of personnel and materials using long cavity lasing. Electronic imaging sensors yield detailed information concerning the micromotions and time variation in reflectivity of targets. It demodulates reflected light to provide unique signatures. These unique signatures may include biological signatures of the objects, such as heart beat, and electromechanical signatures, such as shutters, spatial light modulators, details of identification of vehicles. The signatures can then be analyzed as to whether they are of interest to the user and, if so, the locations then communicated to the user. For example, in some embodiments, it overlays the FOV of the laser with an operator display and identify and categorize the sources of interesting retroreflections. In others, it aurally communicates a bearing from the apparatus to an identified actual object The presently disclosed technique uses what is known as "long cavity lasing". A long cavity laser is formed by a rear reflector, a gain media, and any sufficiently reflective object within the FOV. As those in the art having the benefit of this disclosure will appreciate, the term "laser" is applied to anything from the ultraviolet ("UV") spectrum through the visible to the far infrared ("IR") and even down to the high microwave where it is termed a "maser". Object movement within the FOV does not extinguish the lasing, and so the object is auto-tracked over time. Thus, the long cavity lasing eliminates conventional, mechanical tracking of targets within the scene.

Long cavity lasing is disclosed in, for example, U.S. Pat. No. 3,968,456 ("the '465 patent"); U.S. Pat. No. 6,885,497; and U.S. Pat. No. 7,017,467. Each of these is incorporated by reference below. As described in the '465 patent, at column 1, in lines 7-26, long cavity lasing was developed to address one of the limitations of what was then conventional lasers—the requirement that the components defining the lasing cavity be in close proximity to the laser material. Long cavity lasing, as the term implies, permits a much longer lasing cavity, sometimes tens of kilometers in length.

"Lasing" is the successive amplification of light in multiple round trips from reflections from targets of interest. The lasing process starts essentially from optical noise from a lasing amplification medium at a very low level traveling to the target(s). Lasing does not start from ambient or scattered light from some other source. The emitted radiation is reflected back to the gain media, or laser material, from the target; and travels through the gain media, and a spatial light modulator ("SLM"); before reflecting off a back mirror and back through the system to make another trip to the target.

This process continues. Each pass selectively amplifies the target signal due to non-linear gain depending on the instantaneous value of the lasing intensity for that specific target. In this looping of the light back and forth, the value of the lasing could be dynamically limited to any desired level (for example, eye safety) by the action of a processor and an SLM on a pixel by pixel basis. More technically, from the initial target returns, the detector measures the level of lasing in each pixel. A limit is placed in the processing: when the lasing amplitude reaches some pre-determined level, the processor commands the SML to have increased loss for that pixel from that point in time forward in a classical gain limitation loop.

Figure 2:
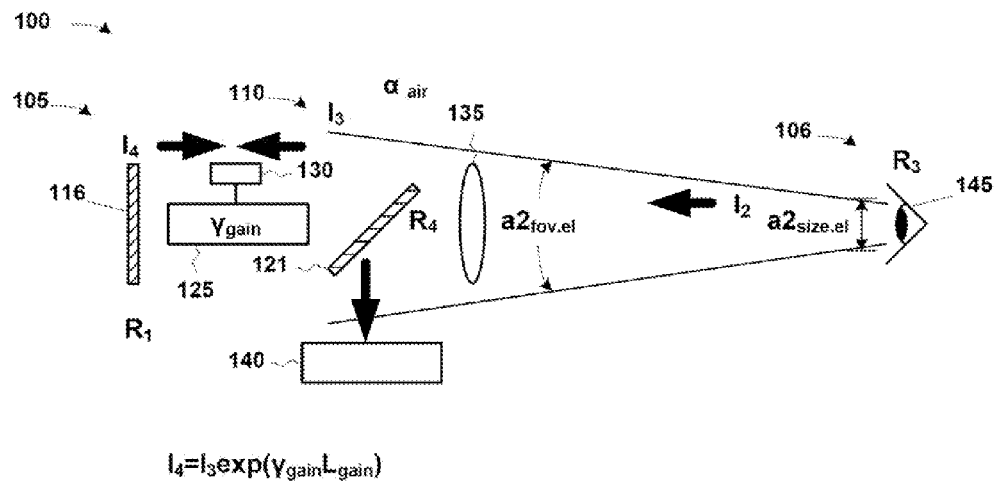

Turning now to the drawings, FIG. 1-FIG. 2 conceptually diagram the adaptation of long cavity lasing in the presently disclosed technique. A portion of this discussion is adapted from the '465 patent. Table 1 provides a additional information regarding the content of FIG. 1-FIG. 2.

TABLE 1

Quantities of FIG. 1-FIG. 2

| Qty | Description |
|---|---|
| $\alpha_{air}$ | the absorption coefficient (units are per km) of the atmosphere |
| $I_0$ | intensity of laser at entrance to 135 going to the right |
| $R_3$ | reflection from target 145 |
| $I_1$ | intensity after passing thru gain |
| $a_1$ | diameter of lens 135 |

TABLE 1-continued

Quantities of FIG. 1-FIG. 2

| Qty | Description |
|---|---|
| $I_3$ | intensity after $I_1$ light propagated to the target 145 |
| $I_4$ | intensity of $I_3$ after being amplified going back through the gain media and reflecting from mirror 116 |

A long cavity lasing apparatus 100 comprises a pair of retrodirective members, indicated generally at 105, 106, respectively, cooperating to form a resonant cavity, indicated generally at 110. The retrodirective member 105 comprises a substantially totally reflective mirror 116. However, it should be understood that any suitable retrodirective means of substantially total reflectivity may be employed as retrodirective member 105, provided it permits establishment of a plurality of transverse modes. Retrodirective member 106 comprises, as will be discussed further below, an object 145 within the FOV of the apparatus 100. The apparatus 100 also includes a mirror 121 of relatively high transparency. For example, the mirror 121 may reflect 10% of the light incident thereon.

A body of laser material 125 is disposed within the resonant cavity 110 between the mirrors 116, 121 and suitable means 130 are provided for exciting the body 125. In addition, a collimating lens 135 is provided and is positioned so that the focal plane of the collimating lens 135 coincides with the detector 140. The lens 135 provides a field of view ("FOV") for radiation from the laser material 125, and radiation incident on lens 135 from any object 145 located within the field of view will be focused by lens 135 on the highly transparent mirror 121 and, hence, most of the radiation will be introduced into the laser material 125.

The object 145 is a source of reflected radiation. A source of reflected radiation might be, for example, a retrodirective member or any other object having a surface oriented to receive radiation from lens 135 and to reflect at least a portion of the radiation to be incident on lens 135. The object may even be, in some embodiments, a biological entity or portion thereof.

In operation, exciter 130 pumps the laser material 125 to an energy level such that the loop gain (gain-to-loss ratio) within the resonant cavity 110 is slightly less than unity. Under these conditions, lasing operation will not occur. However, the introduction into resonant cavity 110 of even a slight amount of additional reflected radiation, as from object 145, will raise the loop gain above unity and will establish lasing operation between retrodirective member 105 and the source of the additional radiation (object 145).

Thus, the apparatus 100 does not enter the lasing phase of operation until receipt of radiation from the object 145. The apparatus 145 then begins lasing within the field of view including the object 145. The object 145 can therefore be considered a component of the apparatus 100 defining the resonant cavity 110. Furthermore, the object 145 may be located many meters from the apparatus 100 and, hence, the name "long cavity lasing".

In one particular embodiment, the output of the long cavity lasing apparatus 100 employs an active feedback control via spoiling the cavity "Q". This is accomplished by changing the reflectivity of a programmable segmented mirror. This may be implemented in the illustrated embodiment as the mirror 116, of which the SLM is an integral part. This could be a SLM, inner resonator optical power limiter ("OPL"), in combination with the detector and its control of the SLM as described below. Alternatively, more traditional liquid crystal designs may be used. The programmable segmented mirror modulates and changes the amplitude of the light along the path of that subsegment of the FOV.

For example, all sufficiently reflective targets would have the apparent reflectance changed such that their imaged levels are limited. That is, the process limits the lasing level on a target. The fundamental reflectivity, which starts the lasing action, will be attenuated on a pixel by pixel basis, so that in the total scheme of things, it would seem that the reflectivity of the target was reduced. The light coming from the target in the early phases of lasing are selectively attenuated by the SLM as described below, and in this sense reducing the reflectivity. The "apparent reflectivity" is therefore lower than the "actual" reflectivity. The level of reflectance change is proportional to the reflectivity for each target controlled by a feedback loop sensing lasing amplitude. This provides maps the reflectivity over the FOV.

More particularly, the SLM will be under dynamic control by the processor to control the level of lasing. As the scene is sampled and intensity of lasing measured in each pixel, constraints on lasing will be imposed by the processor. From the beginning of gain being available in the gain media, the processor evaluates to lasing, looking for targets of interest where the reflection is sufficient for the round trip gain to exceed the loss. This is the threshold of lasing, and as the light continues to progress around the loop, it is amplified to some predetermined safe level. The processor is monitoring the level of lasing and when the level of lasing in a specific pixel is approaching an undesirable level, the corresponding elements in the SLW will be activated.

The two-dimensional SLM can be commanded to any state from some minimal low loss level, up to some very high level—i.e., the SLM is a two-dimensional array of programmable elements). From the diagram of the total system, the SLM will not have a single geometric element to single pixel in the far field correspondence. A single pixel in the target reflection from a far distance would be spread across the SLM by virtue of the lens 135. The distribution of light is described by the mathematical process where the two-dimensional object is Fourier transformed in the image plane of the lens.

The signal fed to the SLM from the processor would therefore be based on the Fourier Transform of the image on 140 but subject to processing and rules to limit the intensity, thus forming an optical power limiter. It is therefore possible to process the image to limit the intensity in a small angle from a target.

The performance of a long cavity lasing apparatus can also be tuned by material and parameter selection in accordance with the presently disclosed technique in a manner not heretofore seen in the art. Lasing is defined as the act of amplification, where even single pass where light enters some media that has a population inversion and capable of stimulated emission. Fluorescence caused by the injection of energy to the laser material is hopefully small during lasing as it is a loss to the amplification process although some oscillations may start from the very low level of spontaneous emission. Thus, parameters associated with these factors can tune the performance of the long cavity lasing apparatus.

This tuning may be used, for example, to help discriminate among objects in the field of view. For example, some objects in the field of view may emit or reflect radiation at a lower level while other may do so at a higher level. The body 125 of laser material may be excited to a level at which received radiation at the lower level is insufficient to push it into the lasing phase of operation but that the higher level will. The long cavity lasing apparatus can therefore be tuned to detect objects having the higher reflectivity while ignoring those with the lower reflectivity.

Thus, in operation, the long cavity lasing apparatus 100 is directed toward a field of view, the field of view 300 in FIG. 3A, for example, as shown in FIG. 1. The radiation will be reflected as shown in FIG. 2 back to the long cavity lasing apparatus 100. Reflectors in the field of view 300 having "sufficient" or "high" reflectivity will generate a "return" 305 (only one indicated) indicating potential objects of interest. In this context "sufficient" or "high" means that if reflects enough of the incident radiation so that the per pass gain through the resonant cavity 110 exceeds the per pass loss so that loop gain will rise above unity.

Note how implementation specific factors influence what is "sufficient" so that the performance of the apparatus 100 can be tuned. Since the object 145 helps define the resonant cavity 110, the amount of reflectance from the object 145 is a factor in determining per pass gain and per pass loss. This factor interacts with other factors in the design to determine the loop gain for the resonant cavity 110 as a whole. The kind of object 145 can therefore be determined a priori so that the types or kinds of objects one desires to detect by the design of other elements of the resonant cavity 110.

However, while the minimum level of reflectivity discriminates against reflectors whose reflectivity is too low to be of interest, it does not discriminate against those whose reflectivity is too high. Accordingly, the presently disclosed technique provides for capture and analysis of the returns.

Capture begins with detection. A portion of the resonating radiation that has seen gain from making round trips to the target is reflected by the mirror 121 as shown in FIG. 1-FIG. 2 to a detector 140. The detector 140 may be, for example, a television camera or some other two-dimensional detector, such as a focal plane array ("FPA"). A TV camera is a 2-D detector with some associated optics to make an image at the focal plane on the detector that detects the light intensity in each pixel of the array.

The detected radiation is converted to an "image" 308, shown in FIG. 3B, using the signal output by the detector 140. An image may be considered to be an ordered set of data, as it is in this case at this point in the process. This data may be stored electronically, processed, and/or rendered so that it may be perceptible to humans. Thus, it may be stored for archiving, processed for analysis, rendered for display on a screen, or all of these things.

The output of the detector in this embodiment is processed by an electronic apparatus of some sort that typically includes at least rudimentary processing capabilities. More particularly, the image 308 from the detector 140 flows to a "computer" or "processor" that can modulate the pixel level reflectivity of the SLM in the mirror 116.

Thus, in the illustrated embodiments, the return processing is computer-implemented, although this is not necessary in all embodiments. In particular, the processing of the acquired data as a precursor to the classification, tracking, etc. may be computer-implemented. Some applications may also take the results of the processing to engage in certain functions using still other computer-implemented tasks, such as auto-tracking a target.

FIG. 4 shows selected portions of the hardware and software architecture of a computing apparatus 400 such as may be employed in some aspects of the present invention. The computing apparatus 400 includes a processor 405 communicating with storage 410 over a bus system 415. The storage 410 may include a hard disk and/or random access memory ("RAM") and/or removable storage such as a floppy magnetic disk 417 and an optical disk 420.

The storage 410 is encoded with a data structure 425. The storage 410 is also encoded with an operating system 430, user interface software 435, and an application 465. The user interface software 435, in conjunction with a display 440, implements a user interface 445. The user interface 445 may include peripheral I/O devices such as a keypad or keyboard 450, a mouse 455, or a joystick 460.

The processor 405 runs under the control of the operating system 430, which may be practically any operating system known to the art. The application 465 is invoked by the operating system 430 upon power up, reset, or both, depending on the implementation of the operating system 430. The application 465, when invoked, performs the method of the present invention. It operates on the image 308 received from the detector 140, shown in FIG. 1-FIG. 2, and sends command and control ("C&C") signals 462 to the SLM of the mirror 116. The user may invoke the application 465 in conventional fashion through the user interface 445 in some embodiments.

The computing apparatus 400 admits wide variation in implementation. It may be deployed on a wide array of platforms, which will greatly affect the implementation. For example, it may be embedded in the rifle of an infantryman. Or, it may be deployed on an aerial or a land vehicle. It may also be deployed in a building, or some other structure or fortification. Each of these deployment types impose different constraints and provides different opportunities.

For example, to be embedded in the infantryman's rifle, the apparatus must be small, compact, and lightweight. The computing system 400 may then be implemented so that the processor 405 is an embedded controller executing a small routine rather than the application 465. It may also implemented in suitably programmed field programmable gate array ("FPGA") or application specific integrated circuit ("ASIC"), in which case the application 425 will be replaced by the programming of the integrated circuit. The storage 410 would probably be just large enough to buffer the data temporarily—long enough to process it and display the result. The display 540 might, in this embodiment, might be an optical sight on the rifle.

Deployment on a vehicle implicates less stringent, but still significant, requirements for considerations like weight, ruggedness, and power consumption. Such an embodiment could therefore use a more powerful, and more power-hungry, type of processor such as a microprocessor or a digital signal processor. The storage 410 could be more spacious, permitting additional functionality. The display 450 might also be changed to something more powerful and versatile, such as a heads-up display ("HUD").

Deployment in a structure implies some greater degree of permanence and space and typically more availability of power. The computing apparatus 400 might be a portion of a much larger computing system comprising multiple machines, thereby leveraging computing resources. The processor 405 might actually be implemented in a processor set, including co-processors, graphics processors, floating point processors, etc. Similarly, the storage 410 can be sufficiently large to not only buffer data, but to archive it long term should that be desired. The computing apparatus 400 will therefore permit wide variation in implementation.

In operation, the image 308 is received from the detector 140, shown in FIG. 1-FIG. 2, and populates the data structure 425 in the storage 410. The data structure 425 may be any suitable data structure known to the art—e.g., a database, queue, list, linked list, flat file, etc. The image 308 is processed by, in this particular embodiment, the application 465 to identify the returns 305, shown in FIG. 3A. As noted above, the returns 305 represent potential objects of interest. Once the returns 305 are identified, the application then analyzes them to determine which of them are objects of interest 310, such as those shown in FIG. 3C.

The illustrated embodiment detects objects of interest 310 from among the returns 305 from a temporal analysis of signal characteristics of the returns. This technique essentially analyzes the amplitude and/or phase variations in the returns to gain information about the potential object of interest providing the reflection. More technically, in the illustrated embodiments, the signal level in the pixel returning from the target is in a closed loop with the SLM. The amplitude of that signal in each pixel is the data input to the detection algorithms used by the application 465.

For example, a static reflection over time may, or may not, discriminate between an object of interest and something that is merely a reflector. A high reflectance traffic sign may not be of interest to someone searching for an enemy sniper or weapons system. A return that is consistently present without change over a long period of time may therefore be discarded as clutter because a person or an active weapons system will not be static for long periods of time. The converse might as well be true for someone who is, in fact, looking for a high reflectance traffic sign.

More sophisticate analyses may also be performed. Consider the example of the hostile enemy sniper. Temporal analysis of the returns might indicate the sniper is in a resting state, with perhaps a relatively higher level of movement and low heart rate. This might change, where the sniper becomes more still with a higher heart rate. One might surmise that the sniper is about to take action that needs to be addressed proactively.

One well developed field of recognition and identification that may be useful in some embodiments is what is known as "laser vibrometry". Laser vibrometry, as alluded to above, monitors micromotion and electromechanical signatures over time for purposes of identifying their sources according to previously known characteristic signatures. However, laser vibrometry is but one technology. The present technique is more general than laser vibrometery and other technologies may be used.

The identification of the objects of interest 310 is performed by matching the sensed characteristics (e.g., amplitude, phase) of the potential objects of interest 305 to stored signatures (not shown). The stored signatures may be comprised of, for example, selected, known characteristics of various objects of interest anticipated to be present. Various techniques are known to the art of laser vibrometry for performing this task and any suitable technique known to that art may be used.

The locations of the identified objects of interest 305 can then be communicated to the user. In the illustrated embodiment, the locations are fused with, or overlaid on, a display 315 of the FOV 300 as shown in FIG. 3D. Technologies for doing this are well known in the art and are frequently used in conjunction with, for example, heads-up displays. Any such technique suitable to a given implementation may be used. Note that, again, implementation specific choices can influence this choice. Greater computing resources will permit more robust displays while lesser computing resources will similarly restrict such robustness.

The locations of the objects of interest 305 may also be communicated in other ways. For example, the locations may be communicated aurally, over an earpiece. The interface 445 will be modified accordingly to includes such an earpiece (not shown) and additional software functionality—e.g., a speech synthesizer—would be added to the software on the storage 410. Still other means of communication may be employed in still other alternative embodiments.

Such a display indicates to the user where in the FOV 300 the objects of interest 305 are located. By monitoring the amplitude variations of the returns in scene, targets of interest (those with specific modulation signatures) can be identified and tracked. Overlaying an image of the scene with auto-tracked targets of interest as shown in FIG. 3D yields a tactical display of the objects movement, patterns, and behavior over time.

Furthermore, it does so with a larger FOV than conventional sensing techniques. FOV is an independent variable depending on the optics chosen. Traditionally, the FOV for conventional laser-based sensors is small because, if it was as large as considered by the presently disclosed technique, the laser would spray energy over the total FOV. This reduces the amount of energy used to sense any particular part of the FOV. The presently disclosed technique only lases to the higher reflectivity targets within the FOV. This yields a much higher efficiency and auto tracking if the targets move within the FOV. Traditional laser design does not have such autotracking.

As is apparent from the discussion above, some portions of the detailed descriptions herein are presented in terms of a software implemented process involving symbolic representations of operations on data bits within a memory in a computing system or a computing device. This includes, for example, the programmed execution of instructions stored in a memory of some kind. These descriptions and representations are the means used by those in the art to most effectively convey the substance of their work to others skilled in the art.

The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The illustrated embodiments suggest use in a military context. In a military context, the presently disclosed technique has potential to identify snipers. However, it is not so limited. The technique may also find application in many civilian contexts. For example, it could be used for remote monitoring in health, law enforcement, and civilian national security contexts.

The technique disclosed above is also wavelength independent for wavelengths within the lasing spectrum. Wavelength selection may, in fact, be a significant factor in some embodiments as a part of the tuning discussed above as some times of reflectors react in characteristically different ways to different wavelengths. Indeed, some embodiments may lase within the FOV using two different wavelengths of radiation as the differential characterization may also impart valuable information in recognition and identification.

The following patents are hereby incorporated by reference for all purposes as if set forth verbatim herein:

U.S. Pat. No. 3,968,456, entitled "Regenerative Laser Device", issued Jul. 6, 1976, to Vought Corporation as assignee of the inventor Albert B. Welch, and now commonly assigned herewith;

U.S. Pat. No. 5,485,012, entitled "Method and Apparatus for Blind Optical Augmentation", issued Jan. 16, 1996, to The United States of America as represented by the Secretary of the Army as assignee of the inventor Wilbur Liebson;

U.S. Pat. No. 5,893,085, entitled "Dynamic Fuzzy Logic Process for Identifying Objects in Three-dimensional Data", issued Apr. 6, 1999, to Lockheed Martin Corporation as assignee of the inventor Ronald W. Phillips;

U.S. Pat. No. 6,885,497, entitled "Laser Method and Apparatus", issued Apr. 26, 2005, to Lockheed Martin Corporation as assignee of the inventor John N. Monroe; and U.S. Pat. No. 7,017,467, entitled "Guided Missile Defense Method and Apparatus", issued Mar. 28, 2006, to Lockheed Martin Corporation as assignee of the inventor John N. Monroe.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A laser-based, remote sensing apparatus, comprising:
  a long cavity laser comprising:
    a gain medium; and
    a segmented mirror configured to return electro-magnetic radiation (EMR) emitted from the gain medium to the gain medium;
    wherein the long cavity laser is configured to establish a laser beam of the EMR between the long cavity laser and a first object in a field of view (FOV) in response to a reflection of the EMR from the first object;
  a detector configured to:
    receive EMR from the FOV, the EMR including a reflected portion of the laser beam; and detect the laser beam based on the reflected portion; and
a controller coupled to the segmented mirror and the detector, and configured to signal the segmented mirror to alter a reflectivity of a portion of the segmented mirror to thereby change an energy level of the laser beam between the long cavity laser and the first object.

2. The laser-based, remote sensing apparatus of claim 1, wherein the controller is further configured to:
   determine a first object modulation signature of the first object based on the reflected portion; and
   identify the first object based on a comparison of the first object modulation signature to a plurality of modulation signatures.

3. The laser-based, remote sensing apparatus of claim 2, wherein the first object modulation signature is determined by a time series analysis of the reflected portion.

4. The laser-based, remote sensing apparatus of claim 1, wherein the detector comprises a focal plane array.

5. The laser-based, remote sensing apparatus of claim 1, wherein the detector comprises a two-dimensional array of pixels.

6. The laser-based, remote sensing apparatus of claim 1, wherein the controller is further configured to:
   determine, based on the reflected portion, a location of the first object within the FOV; and
   overlay the location of the first object on a display of the FOV.

7. The laser-based, remote sensing apparatus of claim 1, wherein the controller is configured to aurally communicate a bearing from the apparatus to the first object.

8. A method comprising:
   establishing, by a long cavity laser comprising a gain medium and a segmented mirror that is configured to return electro-magnetic radiation (EMR) emitted from the gain medium to the gain medium, a laser beam of the EMR between the long cavity and a first object in a field of view (FOV) in response to a reflection of the EMR from the first object;
   receiving EMR from the FOV, the EMR including a reflected portion of the laser beam;
   detecting the laser beam based on the reflected portion; and
   signaling the segmented mirror to alter a reflectivity of a portion of the segmented mirror to thereby change an energy level of the laser beam between the long cavity laser and the first object.

9. The method of claim 8, further comprising:
   determining a first object modulation signature of the first object based on the reflected portion; and
   identifying the first object based on a comparison of the first object modulation signature to a plurality of modulation signatures.

10. The method of claim 9, wherein determining the first object modulation signature comprises determining the first object modulation signature by a time series analysis of the reflected portion.

11. The method of claim 8, further comprising:
    determining, based on the reflected portion, a location of the first object within the FOV; and
    overlaying the location of the first object on a display of the FOV.

12. The method of claim 8, further comprising aurally communicating a bearing from the the long cavity laser to the first object.

13. The laser-based, remote sensing apparatus of claim 1, wherein the long cavity laser is further configured to establish an additional laser beam of the EMR between the long cavity laser and a second object in the FOV in response to a reflection of the EMR from the second object.

14. The laser-based, remote sensing apparatus of claim 13, wherein the detector is further configured to detect the additional laser beam based on a reflected portion of the additional laser beam.

15. The laser-based, remote sensing apparatus of claim 1, wherein the detector is further configured to:
    determine, based on the reflected portion, a first location of the first object within the FOV at a first time; and
    determine, based on the reflected portion, a second location of the first object within the FOV at a second time, wherein the second location differs from the first location.

16. The laser-based, remote sensing apparatus of claim 1, wherein the detector comprises an array of pixels, and wherein the detector is further configured to:
    determine, based on the reflected portion, a first location of the first object within the FOV at a first time based on a location of the reflected portion on the array of pixels; and
    track a change of location of the first object from the first location to a second location based on a change of location of the reflected portion on the array of pixels.

17. A laser-based detection system, comprising:
    a long cavity laser comprising:
       a gain medium; and
       a segmented mirror configured to return electro-magnetic radiation (EMR) emitted from the gain medium to the gain medium;
       wherein the long cavity laser is configured to establish a laser beam of the EMR between the long cavity laser and an object in a field of view (FOV) in response to a reflection of the EMR from the object;
    a detector comprising an array of pixels, and configured to:
       receive EMR from the FOV, the EMR including a reflected portion of the laser beam; and
       detect the laser beam based on the reflected portion; and
    a controller coupled to the detector and configured to determine a location of the object in the FOV based on a location of the reflected portion on the array of pixels.

* * * * *